United States Patent
Kulshreshtha et al.

(10) Patent No.: US 12,537,881 B2
(45) Date of Patent: Jan. 27, 2026

(54) SERVICE MODEL ENGINE(S) FOR GENERATING SERVICE DELIVERY MODELS FROM VENDOR API SWAGGER

(71) Applicant: Oracle International Corporation, Redwood City, CA (US)

(72) Inventors: Kinshuk Kulshreshtha, Kitchener (CA); Shashwata Singh, Pune (IN)

(73) Assignee: Oracle International Corporation, Redwood City, CA (US)

( * ) Notice: Subject to any disclaimer, the term of this patent is extended or adjusted under 35 U.S.C. 154(b) by 15 days.

(21) Appl. No.: 18/741,553

(22) Filed: Jun. 12, 2024

(65) Prior Publication Data

US 2025/0385950 A1 Dec. 18, 2025

(51) Int. Cl.
*H04L 67/51* (2022.01)
*H04L 67/02* (2022.01)

(52) U.S. Cl.
CPC ............. *H04L 67/51* (2022.05); *H04L 67/02* (2013.01)

(58) Field of Classification Search
CPC ................................ H04L 67/02; H04L 67/51
USPC ......................................................... 709/223
See application file for complete search history.

(56) References Cited

U.S. PATENT DOCUMENTS

| 10,956,242 | B1* | 3/2021 | Kumar | ............... | G06F 8/76 |
| 2022/0138091 | A1* | 5/2022 | Kanemaru | .......... | G06F 11/3696 714/38.1 |
| 2023/0106091 | A1 | 4/2023 | Shivashankara | | |
| 2023/0115438 | A1 | 4/2023 | Degraaf et al. | | |
| 2024/0176593 | A1* | 5/2024 | Leng | ................. | G06F 8/22 |

OTHER PUBLICATIONS

"Creating Services via the API", LogicMonitor, Sep. 30, 2022, 2 pages., https://www.logicmonitor.com/support/rest-api-developers-guide/v2/creating-services-via-the-api.
"Creating a Service Connector from a Swagger JSON File," Informatics Documentation, Nov. 2024, 6 pages, https://docs.informatica.com/integration-cloud/application-integration/current-version/design/designing-service-connectors/option-2--generating-a-service-connector-by-importing-a-file/creating-a-service-connector-from-a-swagger-json-file.html.
Extended European Search Report mailed Nov. 5, 2025 for EP Application No. 25181875.3, Examiner: Diana Filimon, 12 pages.

* cited by examiner

*Primary Examiner* — Wing F Chan
*Assistant Examiner* — Leon Y Tseng

(57) ABSTRACT

Various embodiments of the present technology generally relate to systems and methods for providing a service model engine. In an aspect a method includes identifying, by a service model engine, a swagger file from a network vendor and parsing the swagger file for API endpoints. The service model engine may generate resource specifications based on the API endpoints and may generate delivery actions for each API endpoint. Each delivery action may include delivery parameters for each API endpoint, The service model engine may also map each of the delivery parameters to corresponding characteristics in the resource specifications to generate parameter mappings. The service model engine may generate a service delivery model including the resource specifications, the delivery actions, and the parameter mappings, where the service delivery model is used by a service orchestration system to deliver respective services.

20 Claims, 5 Drawing Sheets

SERVICE MODEL ENGINE(S) FOR GENERATING SERVICE DELIVERY MODELS FROM VENDOR API SWAGGER

TECHNICAL FIELD

Various embodiments of the present technology generally relate to deployment of cloud services, operations and software. More specifically, embodiments of the present technology relate to systems and methods for providing service model engine(s) for generating service delivery models from vendor application programming interface (API) swagger.

BACKGROUND

Service orchestration systems are pivotal components in modern society, facilitating the efficient management and coordination of resources and services across diverse domains such as 5G networks and cloud computing environments. These systems serve as centralized platforms for orchestrating the deployment, configuration, and optimization of network functions, applications, and infrastructure. In the context of 5G networks, service orchestration enables operators to dynamically provision and manage virtualized network functions (VNFs) and software-defined networking (SDN) components, supporting a range of advanced services like network slicing and edge computing. Similarly, in cloud computing environments, service orchestration systems streamline the provisioning and scaling of cloud resources, including virtual machines, containers, and storage, to meet the evolving needs of modern applications and workloads.

By providing centralized control, automation, and coordination, service orchestration systems empower organizations to enhance operational efficiency, improve resource utilization, and deliver innovative services to their customers. These systems enable agility and scalability in deploying and managing complex network and computing infrastructures, driving digital transformation and innovation across industries. In an era defined by rapid technological advancements and evolving user demands, service orchestration systems play a critical role in shaping the future of networking and computing, enabling organizations to adapt and thrive in the digital economy.

To deliver communications services, the Service orchestration system begins by designing the necessary configuration in the service inventory based on the requested service order and calculating the delivery parameters for the network. Network vendors like Cisco, Juniper, and VMware provide domain controllers for configuring services such as SD-WAN and VPN, offering REST APIs with Swagger documentation. These APIs enable the Service orchestration system to push configurations to the network. However, a gap exists between the REST API data models from the domain controllers and the service models needed by the Service orchestration system to design the service. That is, the data models used by the domain controllers often do not align with the service-oriented models used by the Service orchestration systems. To address this difference, organizations often manually create adapters that translate requests from the Service orchestration system into a format understood by the domain controllers. Creation of these adapters requires developers to have in-depth knowledge of both the Service orchestration system and the domain controller interfaces, making the process ad-hoc, time-consuming, complex, and costly.

Accordingly, there exists a need for service model engine(s) for generating service delivery models from vender API swagger documentation. In particular, there is a need for a service model engine that generates service models that are aligned with downstream domain controller interfaces, thereby ensuring seamless integration between Service orchestration systems and vendor domain controllers, which in turn reduces implementation and integration complexity and cost.

The information provided in this section is presented as background information and serves only to assist in any understanding of the present disclosure. No determination has been made and no assertion is made as to whether any of the above might be applicable as prior art with regard to the present disclosure.

Overview

Technology is disclosed herein for systems and techniques for providing service model engines. In an aspect, a service model engine may receive a swagger file from a network vendor, in particular, a domain controller associated with the network vendor. From the swagger file, the service model engine may determine API endpoints used to communicate with backend resources. Based on the API endpoints, the service model engine may determine associated API methods and related method descriptions for each API endpoint. In some embodiments, the service model engine may generate characteristics for each of the API endpoints. The service model engine may also generate resources specifications for each of the relevant API endpoints. Each of the resource specifications may include characteristics associated with a respective API endpoint that may correspond to parameters for provisioning or configuring a respective resource.

The service model engine may also generate delivery actions based on the API method. Each delivery action may correspond to a respective API method and include one or more delivery parameters. Based on the delivery parameters, the service model engine may generate parameter mappings which map each of the delivery parameters to a respective characteristic in the resource specifications. The service model engine may then generate a service delivery model that includes the resource specifications, the delivery actions, and the parameter mappings for the API endpoints. As will be described in greater detail below, a service orchestration system may use the service delivery model to deliver respective services.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

Figure 1:
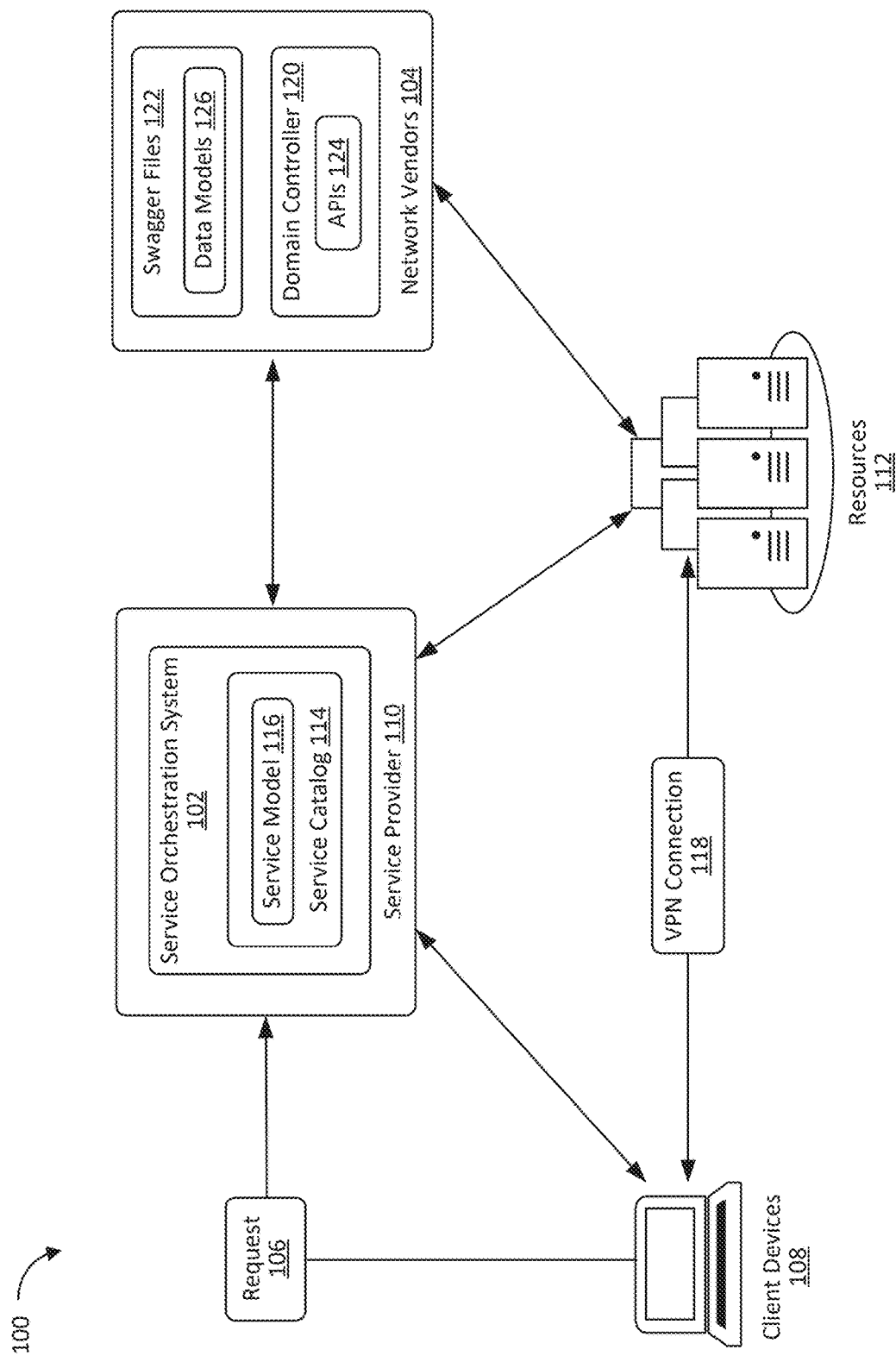
FIG. 1 illustrates an example operational environment in which a service orchestration system coordinates with a network vendor to service a client request, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Service orchestration systems are essential in modern society, managing and coordinating resources and services across domains like 5G networks and cloud computing environments. These systems act as centralized platforms, orchestrating the deployment, configuration, and optimization of network functions, applications, and infrastructure. Within 5G networks, service orchestration allows operators to dynamically provision and manage virtualized network functions (VNFs) and software-defined networking (SDN) components, enabling advanced services such as network slicing and edge computing. In cloud computing, service orchestration systems streamline the provisioning and scaling of resources, including virtual machines, containers, and storage, to meet the demands of modern applications and workloads.

By offering centralized control, automation, and coordination, service orchestration systems enhance operational efficiency, improve resource utilization, and deliver innovative services. They enable agility and scalability in deploying and managing complex network and computing infrastructures, driving digital transformation and innovation across industries. As technology advances and user demands evolve, service orchestration systems are crucial for organizations to adapt and thrive in the digital economy.

To deliver communications services, the service orchestration system starts by designing the necessary configuration in the service inventory based on the service order and calculating the network delivery parameters. Network vendors such as Cisco, Juniper, and VMware provide domain controllers for configuring services like SD-WAN and VPN, offering REST APIs along with swagger files. Swagger files, also known as OpenAPI specifications, provide a standardized format for describing the structure and capabilities of these APIs.

Following conventional approaches, service orchestration systems often use these swagger files to understand the available API endpoints, request parameters, and response formats, enabling automated interaction with the domain controllers. However, there is often a gap between the REST API data models from the domain controllers and the service models needed by the service orchestration system. The data models used by domain controllers do not always align with the service-oriented models used by the service orchestration systems.

To bridge this gap, organizations often manually create adapters that translate requests from the service orchestration system into a format the domain controllers can understand. Creating these adapters requires developers to have deep knowledge of both the service orchestration system and the domain controller interfaces, making the process ad hoc, time-consuming, complex, and costly.

To address the shortcomings of conventional approaches between network vendors and service orchestration systems, example service model engines are provided herein. As will be expanded on below, by leveraging swagger files, the service model engine can automatically or semi-automatically generate a service delivery model based on a requested service. The service model engine provides a streamlined process for furnishing services and provisioning resources, reducing the complexity and improving the efficiency of integrating diverse network services into a unified orchestration framework.

As will be described in greater detail below, the service model engine may identify a swagger file associated with a domain controller of a respective network vendor. From the swagger file, the service model engine may determine API endpoints associated with a respective service request. For each of the API endpoints, the service model engine may determine an API method and related method description. Using the API methods, the service model engine may generate resource specifications for each of the API endpoints. These resource specifications may include the characteristics of each respective API endpoint.

In addition to the resource specifications, the service model engine may generate delivery actions including corresponding delivery parameters for the methods of each API endpoints. Then the service model engine may map each of the delivery parameters to a respective characteristic in the resources specifications. Together the resource specifications, the delivery actions, and parameter mapping of the delivery parameters to respective characteristics in the resource specifications may be a service delivery model generated by the service model engine. The service delivery model may be used by the service orchestration system to fulfill service requests, such as by provisioning and configuring resources via domain controllers.

Figure 5:
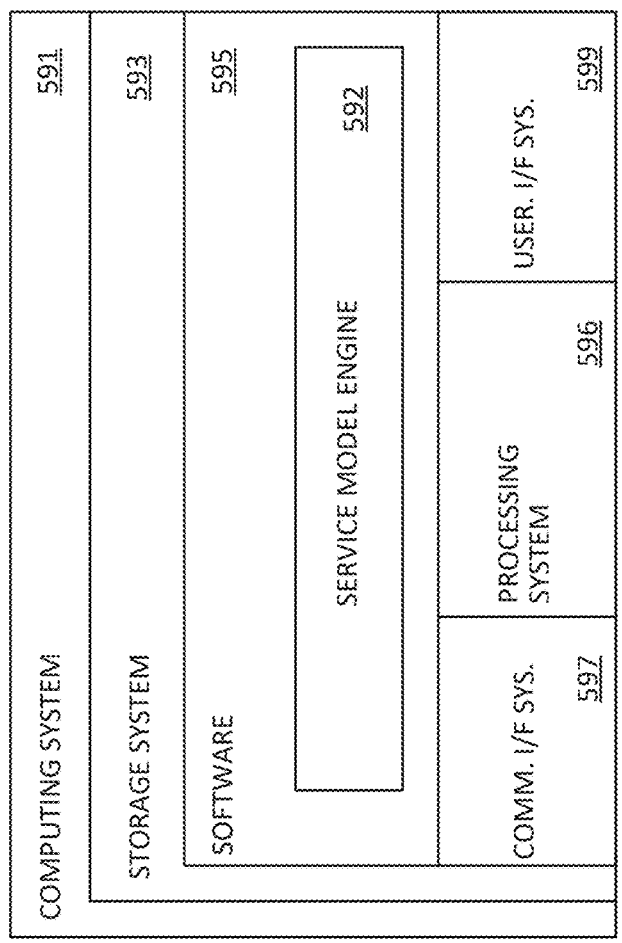
FIG. 5 shows an example computing device suitable for providing a service model engine and its related functions, according to an embodiment herein.
Figure 5:

Turning now to the Figures, FIG. 1 illustrates an example operational environment 100 in which a service orchestration system 102 coordinates with a network vendor 104 to service a client request 106, according to an embodiment herein. The service orchestration system 102, also referred to herein as a service orchestrator, may provide one or more services to a client device 108. In particular, the service orchestration system 102 may orchestrate the deployment, configuration, and optimization of network functions, applications, and infrastructure within the operational environment 100 to service requests received from the client device 108. For example, the operational environment 100 may be a 5G network and the service orchestration system 102 may provision and manage VNFs and SDN components to provide services to the client device 108, of which system 500 in FIG. 5 is broadly representative.

When the client device 108, which may be a laptop or smartphone, transmits the request 106 to a service provider 110, such as a request to establish a VPN connection 118 within the service provider's 110 network, a series of orchestrated actions between the service orchestration system 102 and the network vendors 104 may be performed to furnish that request 106. It should be appreciated that while the following description is with respect to the request 106 being to establish a VPN connection 118 within the operational environment 100, the discussion is equally applicable to other request and environments. Responsive to the request 106, the service orchestration system 102, which is responsible for managing network service provision, may begin orchestrating configuration of network resources 112 to fulfill the request 106.

To aid in orchestration of resources and services, the service orchestration system 102 may engage with a respective network vendor 104. In particular, the service orchestration system 102 may engage with a domain controller 120 provided by the network vendor 104. As those skilled in the art readily appreciate, the network vendor 104 may include one or more domain controllers 120 that act as a central authority for configuring various network resources 112. The domain controller 120 may be a dedicated device or software application that centralizes the administration and enforcement of policies, configurations, and resources within a network domain or environment. As such, the domain controller 120 may serve as a control point for orchestrating and coordinating the deployment, configuration, and management of network services, ensuring consistency, security, and reliability across the infrastructure.

As part of its orchestration, the service orchestration system 102 may also consult a service catalog 114, which contains detailed descriptions of available network services and their corresponding configurations. Within the service catalog 114, the service orchestration system 102 may identify the appropriate VPN service offering that aligns with the client's request 106. The service catalog 114 may include one or more service models 116, which may define characteristics, capabilities, and requirements for a respective service in a standardized and abstracted manner. For example, the service models 116 may include service-specific information such as service functionality, performance metrics, resource dependencies, and operational parameters.

Leveraging a respective service model 116, the service orchestration system 102 may delineate the necessary resources, configurations, and dependencies required to instantiate the requested VPN connection 118. For example, the service orchestration system 102 may analyze the requirements specified in the service model 116, identify the necessary resources 112 and configurations, and orchestrate the deployment and configuration of those resources 112 within the network infrastructure. In essence, the service model 116 serves as a blueprint or template that guides the orchestration process, ensuring that services are provisioned and configured in accordance with predefined standards and best practices. By decoupling service provisioning from underlying device-specific details, the service models 116 enable greater agility, flexibility, and efficiency in managing network services within complex and dynamic environments.

In some embodiments, the service orchestration system 102 may utilize Swagger files 122 obtained from the network vendor 104 to generate a service model 116 tailored to the specific service request 106. These Swagger files 122 provide a standardized overview of the available endpoints, request/response formats, and parameters for interacting with the vendor's devices and platforms, guiding effective communication with the domain controller's APIs 124. In some embodiments, the APIs 124 may be representational state transfer application programming interface (REST) APIs. The Swagger files 122 often includes detailed data models 126, which provide a comprehensive overview of the structure and format of data that can be exchanged with the API 124. These data models 126 generally specify the types of input parameters, the expected data types, constraints, and the structure of request and response payloads.

Leveraging the Swagger files 122, the service orchestration system 102 constructs a service model 116 aligned with the capabilities of the domain controller 120, ensuring accurate and consistent exchanges of configuration instructions and parameters for furnishing the desired service, such as the VPN connection 118, from the service catalog 114.

During the provisioning process, the service orchestration system 102 may integrate the data model 126, service model 116, and service catalog 114 to streamline resource allocation within the network environment 100. In such a case, the data model 126 furnishes intricate technical specifications and parameters essential for programmatic interaction with network devices or platforms. Concurrently, the service model 116 details the desired service characteristics, functionalities, and configurations, while the service catalog 114 stores predefined service templates or blueprints. Combining these components, the service orchestration system 102 aligns the requirements outlined in the service model 116 with the technical specifics provided by the data model 126, thereby ensuring compatibility between desired service configurations and the capabilities of underlying network devices. Leveraging information from the data model 126, the service orchestration system 102 interacts programmatically with network devices, configuring resources according to the specifications outlined in the service model 116. Additionally, the service orchestration system 102 consults the service catalog 114 to select suitable service templates that align with the requested service, using them as blueprints for resource provisioning. Through this integrated approach, the service orchestration system 102 can automate provisioning workflows, guaranteeing accurate and efficient allocation of network resources based on desired service specifications.

Following the successful provisioning of network resources 112, the service orchestration system 102 may undertake various validation checks and testing to ascertain the functional integrity of the VPN connection 118. This may encompass verification of connectivity, testing of encryption protocols, monitoring of traffic flow, and validation of compliance with security policies. Any discrepancies between the actual and expected configurations, as defined within the service model 116, are addressed to rectify deviations and ensure adherence to service standards. Upon successful establishment of the VPN connection 118, the client device 108 may receive notification of the completion of the provisioning process. This notification, which may be generated by the service orchestration system 102, may signify that the client device 108 can now securely access the network resources 112 provided by the service provider 110, thus culminating in the fulfillment of the client's request 106.

Current techniques and approaches for generating the service models 116 from the Swagger files 122 typically falls on developers, entailing a manual or semi-automated process. That is, current methods involve developers manually reviewing and parsing the Swagger files 122 to grasp API endpoints, methods, parameters, and data models 126. Once the Swagger files 122 are parsed, developers must manually align these API capabilities with service requirements delineated in the service catalog 114 to ensure harmony between technical API specifics and high-level service needs. Utilizing this comprehension, developers then manually craft the service models 116, often resorting to scripts, configuration files, or code to delineate service provisioning and management. Throughout, developers validate these service models 116 by testing them against actual APIs, tweaking them based on test results to refine accuracy.

Accordingly, current techniques and approaches for generating the service models 116 bears numerous disadvantages. One disadvantage is the manual nature of current techniques, which require extensive time and effort from developers and contain a heightened risk of human error and inconsistency. For example, current approaches often require developers to understand both the service orchestration system 102 and the domain controller 120 interfaces in detail, and in an ad-hoc process, generate a one-off adaptor for converting a request from the service orchestration system 102 into a format that is understood by a given controller 120. As can be appreciated, this is a complex and time-intensive process. Additionally, conventional approaches have limited scalability since manual processes often struggle to keep pace with evolving network environments and service requirements. Moreover, dependency on individual expertise also poses a challenge, potentially hindering collaboration and knowledge sharing within development teams. In sum, conventional approaches to generating service models are time and cost intensive, having heightened risks of error and inconsistency, and are limited in scalability.

Figure 2:
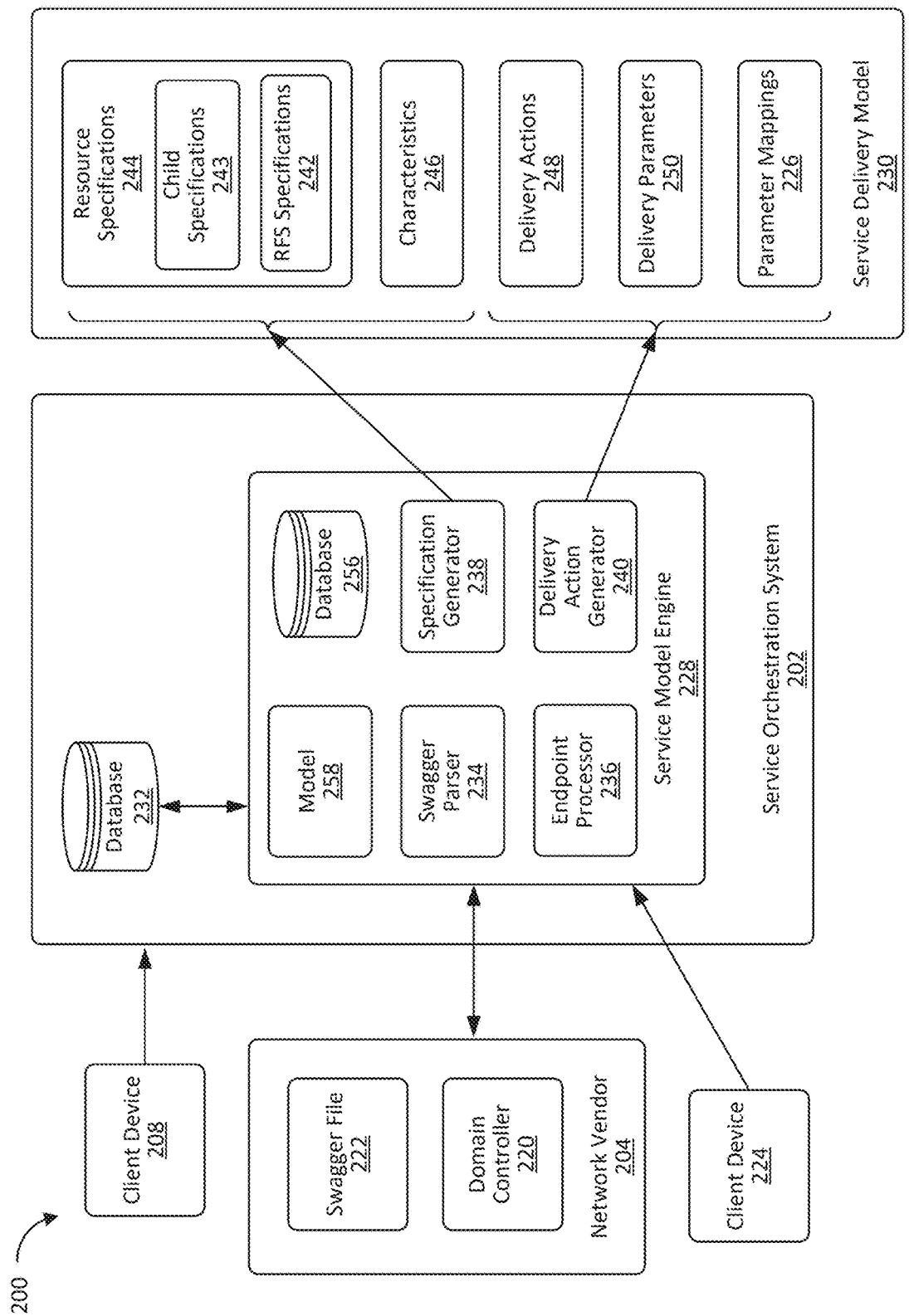
FIG. 2 illustrates an example operational environment including a service model engine, according to an embodiment herein.

To address the above issues with conventional approaches to service model generation, an example service model engine and its related functionality is provided herein. Referring now to FIG. 2, an example operational environment 200 including a service model engine 228 is illustrated, according to an embodiment herein. The operational environment 200 may be the same or similar to the operational environment 100 in that the operational environment 200 includes a service orchestration system 202 and a network vendor 204, which may be the same or similar to the service orchestration system 102 and the network vendor 104, respectively. As shown, the service orchestration system 202 may include the service model engine 228. Although the remaining discussion involves the service orchestration system 202 including the service model engine 228, it should be appreciated that in other scenarios, the service model engine 228 may be provided or hosted by a third party. In such cases, the service orchestration system 202 may operationally communicate with the third party to perform and/or coordinate the generation of a service delivery model 230, as described herein.

As described above, the service orchestration system 202 may coordinate with a domain controller 220 of the network vendor 204 to provision and configure resources responsive to a service request submitted by a client device 208. To aid in provisioning and configuring resources, the service orchestration system 202 may include the service model engine 228 for generating the service delivery model 230. That is, the service model engine 228 may generate the service delivery model 230 responsive to receiving the service request from the client device 208. It should be appreciated that while the following discussion is with respect to the service model engine 228 generating a service delivery model 230 responsive to receiving a service request from the client device 208, in some embodiments, the service model engine 228 may generate the service delivery model 230 prior to receiving a service request. In such cases, when the service request is received by the service orchestration system 202, the service model engine 228 may then populate the service delivery model 230 with the respective information from the service request.

Figure 3:
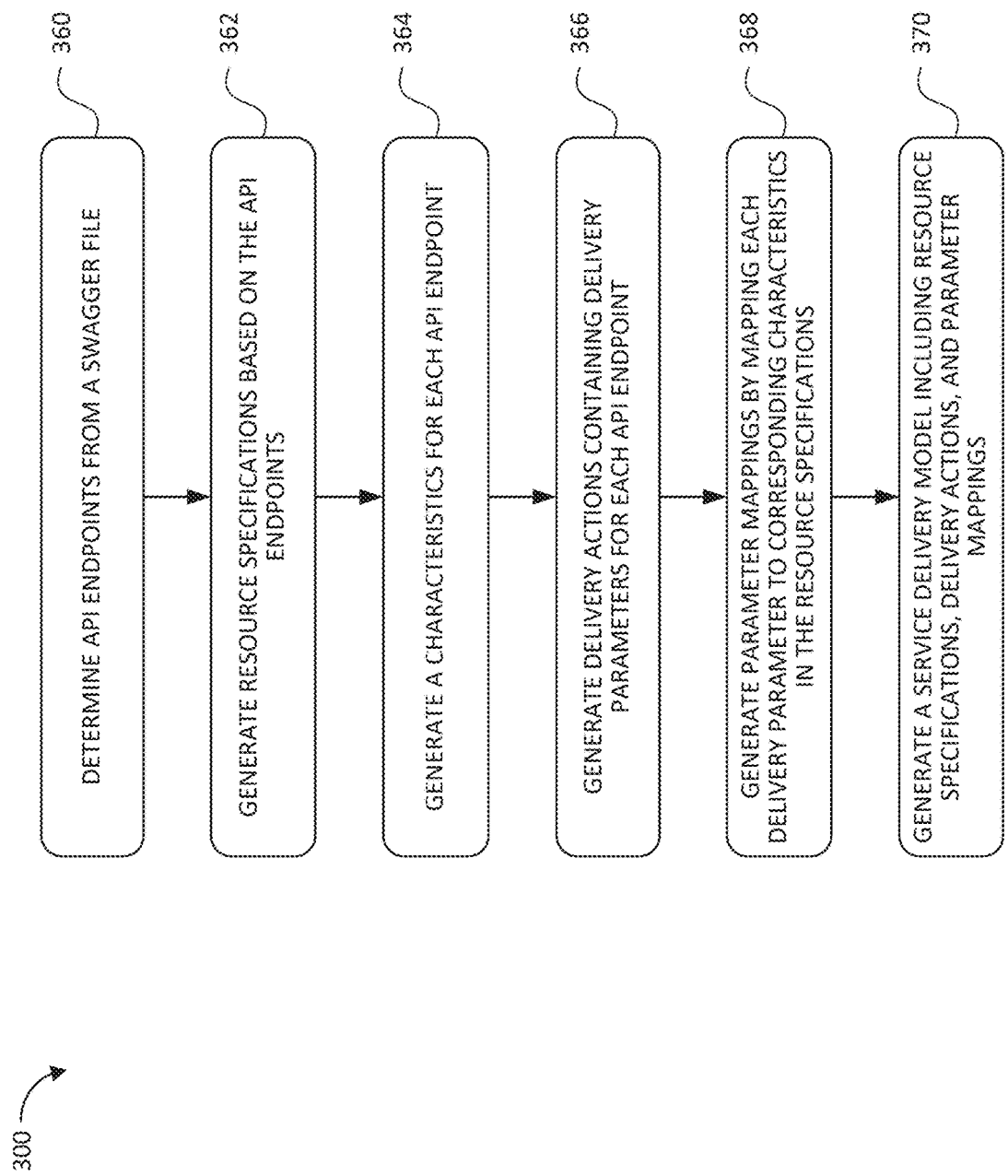
FIG. 3 illustrates an example service model engine process, according to an embodiment herein.

For case of explanation, FIG. 2 is described in conjunction with FIG. 3, which provides an example service model engine process, in particular a process 300 for providing the service model engine 228 and one or more of its functions, according to an embodiment herein. While FIG. 3 is described with relation to FIG. 2, it should be appreciated that components, elements, and steps from any other Figures described herein may be equally applicable.

To generate the service delivery model 230, the service model engine 228 may identify a swagger file 222. As noted above, domain controllers 220 of the network vendor 204 may contain or otherwise have associated swagger files 222 that contain detailed information on how the service orchestration system 202 can communicate and respond to resources provided by the network vendor 204. In some embodiments, each domain controller 220 or each grouping of domain controllers 220 may have a respective swagger file 222 for coordinating with resources associated with that respective domain controller 220.

In some embodiments, the service model engine 228 may fetch the swagger file 222 directly from the network vendor 204, for example by making an API call for the swagger file 222. As noted above, fetching the swagger file 222 may be performed responsive to receiving a service request from the client device 208 or may be performed prior to receiving a service request from the client device 208. In other embodiments, the service orchestration system 202 may retrieve one or more swagger files 222 from the network vendor 204 at an initial time and store the swagger files 222 in a database 232. As can be appreciated, if the service orchestration system 202 customarily coordinates resources with the network vendor 204, then the service orchestration system 202 may retrieve the swagger files 222 from the network vendor 204 in anticipation of provisioning and configuring the resources via the network vendor 204 at a future date.

In some cases, as part of identifying the swagger file 222, the service model engine 228 may determine whether the swagger file 222 corresponds to a specific service. For example, the swagger file 222 may correspond to servicing the VPN connection 118, as described above. As such, the service model engine 228 may identify the swagger file 222 when a service request for a VPN connection, such as the VPN connection 118 is received.

Once the service model engine 228 identifies the swagger file 222, the service model engine 228 may determine API endpoints from the swagger file 222 (360). In particular, the service model engine 228 may include a swagger parser 234. When the swagger file 222 is identified, the swagger parser 234 may import and parse the swagger file 222 to determine the API endpoints within the swagger file 222. As noted above, the swagger file 222 contains various details for communicating with network resources, including API endpoints which outline the specific methods, parameters, and data formats required for provisioning and managing the respective service. As such, the swagger parser 234 may initially parse the swagger file 222 to determine the API endpoints associated with the respective service.

As part of the parsing process, the swagger parser 234 may generate a listing of the API endpoints identified from the swagger file 222. Table 1 provided below illustrates an example listing of API endpoints identified by the swagger parser 234 from a VMware swagger file for Velo Cloud.

TABLE 1

API Endpoints

| | | |
|---|---|---|
| login | edge | Migration |
| enterprise | apiToken | Monitoring |
| clientDevice | userMaintenance | operatorUser |
| compositeRole | enterpiseProxy | Pki |
| operator | partner | Role |
| create | proxy | Image |
| msp | event | System |
| delete | firewall | systemProperty |
| get | functionalRole | vcoDiagnostics |
| update | gateway | vcoInventory |
| configuration | gatewayPool | Vpn |
| network | linkQualityEvent | |
| disasterRecovery | metrics | |

As shown above, the API endpoints may relate to a variety of different services or actions. As such, in some embodiments, the swagger parser 234 may filter the API endpoints based on a respective service or action, such to identify only API endpoints that relate to the respective service or action. For example, the swagger parser 234 may filter the API endpoints for API endpoints relating to provisioning and configuration, API endpoints relating to assurance, API endpoints relating to monitoring, etc. Following the above VMware Velo Cloud example, the swagger parser 234 may filter the API endpoints for API endpoints that relate to provision and configuration. When the swagger parser 234 filters the API endpoints based on provisioning and configuration, a subset of the API endpoints relating only to these actions may be determined. Table 2 provided below illustrates the provisioning and configuration API endpoints identified by the swagger parser 234 from the API endpoints in Table 1.

TABLE 2

Provisioning and Configuration API Endpoints

| | | |
|---|---|---|
| login | edge | Migration |
| enterprise | apiToken | Monitoring |
| clientDevice | userMaintenance | operatorUser |

In some embodiments, to filter the API endpoints to identify the subset of API endpoints relating to a respective service or action, the swagger parser 234 may perform a keyword search. By filtering the API endpoints to only those relating to a respective service or action, the service model engine 228 enhances the efficiency and accuracy of the service delivery model 230 by only including targeted and context-specific endpoints. In an example, the swagger parser 234 may perform a keyword search based on keywords relating to that respective service or action. For example, the service model engine 228 may include a keyword database 256 that includes a listing of relevant keywords associated with a range of services or actions. As such, the swagger parser 234 may determine relevant keywords based on the service or action the swagger parser 234 is filtering the API endpoints for. As noted above, the desired service or action may be determined based on the service request from the client device 208. In other embodiments, the service model engine 228 may receive an indication of a desired service or action from a client device 224. The client device 224 may correspond to a developer or individual who is associated with the service orchestration system 202 and facilitates furnishing of resources for customers, such as the client device 208.

In some embodiments, instead of performing a keyword search, the service model engine 228 may include an artificial intelligence (AI) generative model 258 that determines the API endpoints relating to respective services and actions. For example, the AI generative model 258 may automatically analyze and classify the API endpoints from the swagger file 222 to identify relevant endpoints associated with specific services and actions. The AI generative model 258 may be trained on a dataset stored or fetched from the database 256 containing keywords associated with respective services or actions. As the service model engine 228 parses swagger files 222 overtime and generates respective service delivery models 230, the AI generative model 258 may adjust its algorithmic approach to filtering and identifying the subset of API endpoints for respective services or actions. In some embodiments, the client device 224 may monitor and tune the output (e.g., subset of API endpoints) generated by the AI generative model 258.

After the API endpoints, in some cases, the subset of the API endpoints, are determined by the service model engine 228, the service model engine 228 may select the API endpoints from which to generate the service delivery model 230. The selection of API endpoints from which the service delivery model 230 is generated is referred to herein as the API endpoint listing. In some embodiments, the service model engine 228 may generate the API endpoint listing based on the selection. The selection of API endpoints may include a subset of the API endpoints or all of the API endpoints identified from the swagger file 222. In some embodiments, the API endpoint listing may include additional API endpoints added by a developer, such as the client device 224. That is, the client device 224 may indicate to add or remove one or more API endpoints from the endpoints identified by the swagger parsers 234 to generate the API endpoint listing.

The service model engine 228 may include an endpoint processor 236 that may parse each API endpoint within the API endpoint listing (e.g., subset of API endpoints vs. all API endpoints). That is, the endpoint processor 236 may select a first API endpoint and then parse the swagger file 222 to determine and generate an API method and method description for the first API endpoint, then select a second API endpoint and determine/generate the API method and method description for that API endpoint. In other words, the endpoint processor 236 may step through each API endpoint to determine and/or generate a respective API method and method description. Table 3 provided below illustrates example API methods and method descriptions generated for each of API endpoint identified in the subset of endpoints identified in Table 2.

TABLE 3

| API End Point | API method | Method Description |
|---|---|---|
| edge | edgeProvision | Provisions an Edge before activation. |
| edge | deleteEdge | Deletes the specified Edge(s) (by id or an array of ids). |

TABLE 3-continued

| API End Point | API method | Method Description |
| --- | --- | --- |
| edge | deleteEdgeBgpNeighborRecords | Deletes BGP record(s) matching the specified record keys (neighborIp) on the Edges with the specified edgeIds, if they exist. |
| edge | edgeCancelReactivation | Cancels a pending Edge reactivation request for the specified Edge (by edgeId). |
| edge | edgeRequestReactivation | Prepare Edge for reactivation |
| edge | setEdgeBastionState | Set the edge bastion state |
| edge | setEdgeEnterpriseConfiguration | Apply configuration profile to Edge |
| edge | setEdge HandOffGateways | Set Edge on premise hand-off gateway(s) |
| edge | setEdgeOperatorConfiguration | Apply an Operator Profile to an Edge |
| edge | unsetEdgeOperatorConfiguration | Unset an Edge's Operator Profile |
| edge | update AnalyticsSettingsForEdges | Update Edge Analytics Settings |
| edge | updateEdgeAdminPassword | Update Edge local UI authentication credentials |
| edge | updateEdgeAttributes | Update Edge attributes |
| edge | updateEdgeCredentialsByConfiguration | Update Edge local UI credentials by configuration profile |
| edge | insertEdgeCertificate | Insert Edge Certification |
| edge | updateLinkAttributes | Update WAN link |
| ClientDevice | setClientDeviceHostName | Set hostname for client device |
| compositeRole | createByEnterprise | Create a composite role based on the role parameters provided by the enterprise |
| compositeRole | createByEnterpriseProxy | Create a composite role based on the role parameters provided by the MSP |
| compositeRole | createByOperator | Create a composite role based on the role parameters provided by the Operator |
| configuration | clone AndConvertConfiguration | Clones the specified network configuration |
| configuration | cloneConfiguration | Clone configuration profile |
| configuration | cloneEnterpriseTemplate | Creates a new enterprise configuration from the enterprise default configuration. |
| configuration | insertConfigurationModule | Creates a new configuration module for the specified configuration profile. |
| configuration | updateConfiguration | Updates the specified configuration profile record |
| configuration | updateConfigurationModule | Updates the specified configuration module and/or modifies its network service associations |
| network | insertNetworkGatewayPool | Creates a gateway pool for the specified network. |
| network | updateNetworkGatewayPoolAttributes | Updates the configurable attributes (name, description, and handOffType) of the specified gateway pool (by id or gatewayPoolId). |
| gateway | gatewayProvision | Provisions a gateway into the specified operator network |
| gateway | deleteGateway | Delete a gateway by id |
| gateway | setGatewayBastionState | Advance the gateway bastion state machine for the specified gateway |
| gateway | updateGatewayAttributes | Update gateway attribute |
| gateway | deleteReplacementGateway | Delete replacement gateway property by gatewayId |
| gateway | setReplacementGateway | Insert/Update replacement gateway along with migrationDeadLineDate. |
| gatewayPool | addGatewayPoolGateway | Add one or more gateways to a gateway pool |
| gatewayPool | removeGatewayPoolGateway | Remove one or more gateways from a gateway pool |
| vcoInventory | associateEdges | Associate Edge inventory from Maestro with Enterprise or MSP's Enterprise. |
| vcoInventory | associateExistingEdge | Associate existing logical Edge with inventory Edge |
| vcoInventory | deleteRmaInventoryItems | Delete RMAed inventory Edges if they have correct states |
| vcoInventory | reassignInventoryItems | Reassign edge to other partner's enterprise |
| vcoInventory | unassignEdges | Unassign and delete Edge inventory from Enterprise or MSP's Enterprise. |
| vpn | generate VpnGatewayConfiguration | Provision a non-SD-WAN site |

To determine the API method and corresponding method description, the endpoint processor 236 may parse the swagger file 222 for specific code, text format, or keywords. For example, for the API endpoint "edge," the endpoint processor 236 may parse the swagger file 222 for "/edge/" to determined API methods or may parse the swagger file 222 for the term "summary" with relation to "edge" to determine the related API method. Once an API method is determined, the endpoint processor 236 may parse the swagger file 222 for "description" related to the API method. To further illustrate, below is an example segment of a swagger file.

```
"/edge/edgeProvision" : {
    "post" : {
        "summary" : "Provision Edge",
        "description" : "Provisions an Edge before activation. \n\nPrivileges
required: \n\n\'CREATE' 'EDGE'",
        "operationId" : "edge_edge_provision"
```

To identify the above segment in the swagger file 222, the endpoint processor 236 may perform a search for /edge/ or "edge." From there, the endpoint processor 236 may determine "edgeProvision" as the API method and "Provisions an Edge before activation" as the method description. In some embodiments, this may be performed as a keyword search, while in other embodiments, the AI generative model 258 may parse the swagger file 222 to determine the API method and corresponding method description. As noted above, the AI generative model 258 may be a dynamic model, such as a neural network, that adjusts and advances over time as service delivery models 230 are generated from various swagger files 222.

Once the listing of API endpoints is determined, the service model engine 228 may generate resource specifications for each of the API endpoints (362). In particular, the service model engine 228 may include a specification generator 238. The specification generator 238 may generate a resource specification 244 for each of the API endpoints in the listing, and in some embodiments, one or more selected API methods. These resource specifications 244 may be a standard resource specification, a child resource specification 243, or a resource facing service (RFS) specification 242. As those skilled in the art readily appreciate, these resource specifications 244 may be part of the service catalog 114 and may be used by the service orchestration system 202 to furnish a respective service. For example, a standard resource specification, as referred to as the resource specification 244, generally details the necessary components and configurations required for a service. A child resource specification 243 refers to a subordinate or dependent resource within a larger resource specification (e.g., standard resource specification), outlining its specific requirements. And a RFS specification 242 describes the interface and characteristics of a respective service as it interacts with other resources or services, ensuring compatibility and integration within the overall service architecture.

In an example, the specification generator 238 generates a resource specification 244, such as the standard resource specification for each API endpoint in the listing. Then, the specification generator 238 may create additional resource specifications, RFS specifications 242, or child specifications 243 based on the API methods corresponding to each API endpoints. Each of these actions are described in turn below.

To generate the resource specifications 244, the specification generator 238 may select an API endpoint to generate the corresponding resource specification 244. The specification generator 238 may then determine the API method associated with the API endpoint. The specification generator 238 may determine parameters in the swagger file 222 associated with the API endpoint and the API method. From the parameters associated with the API method and API endpoint, the specification generator 238 may generate characteristics for the resource specification 244. That is, the resource specification 244 is generated to include characteristics generated from the parameters associated with the API method and API endpoint.

Following the above VMware Velo Cloud example, the specification generator 238 may generate a resource specification 244 for each of the API endpoints indicated in the below Table 4.

TABLE 4

| Resource Specification |
| --- |
| Edge |
| Network |
| Gateway |
| VCO Inventory |
| Client Device |
| Gateway Pool |

Once the resource specifications 244 are generated for each of the API endpoints, the specification generator 238 may generate one or more child specifications 243, RFS specifications 242, or additional resource specifications. For example, the specification generator 238 may parse the swagger file 222 to determine a relationship between two API endpoints or between API methods corresponding to two API endpoints. Based on the relationship, the specification generator 238 may generate a child resource specification and associate the child resource specification with another resource specification 244. In some embodiments, the specification generator 238 may determine the relationship based on the API methods associated with respective API endpoints. Similarly, the specification generator 238 may determine one or more RFS specifications 242 based on the API methods associated with the API endpoints.

In an example embodiment, the specification generator 238 may perform a keyword mapping based on relationship keywords to determine relationships between related API methods and/or API endpoints. For example, the specification generator 238 may search for API methods and respective method descriptions that include terms such as "update," "associate," "create," and the like. The specification generator 238 may then determine context around the relationship keywords (e.g., "update") and determine a related API endpoint and/or API method. Once the related API endpoint and/or API method is determined, the specification generator 238 may associate the resource specifications as related to each other (e.g., child resource specification 243).

Following the above VMware Velo Cloud example, the specification generator 238 may generate the following additional resource specifications, which include child specifications 243 and RFS specifications 242, as illustrated in below Table 5. As shown, the relationship and/or type of resource specification 244 may be associated with a respective API endpoint.

TABLE 5

| API End Point | API method | API method Description | RFSs | Child Resources |
|---|---|---|---|---|
| edge | update LinkAttributes | Update WAN link | | Link |
| vcoInventory | associateEdges | Associate Edge inventory from Maestro with Enterprise or MSP's Enterprise. | | Edge |
| compositeRole | createByEnterprise | Create a composite role based on the role parameters provided by the enterprise | Enterprise | |
| compositeRole | createByOperator | Create a composite role based on the role parameters provided by the Operator | Operator | |

In some embodiments, the service model engine 228 may generate characteristics for each API endpoint (364). That is, the service model engine 228 may generate characteristics from corresponding parameters of the API methods for each API endpoint and tag them to an appropriate resource specification 244 or RFS specification 242. For example, the specification generator 238 may also parse each API endpoint within the API endpoint listing to generate related characteristics 246 for a respective resource specification 244 and/or RFS specification 242. In some embodiments, the characteristics 246 may include or relate to parameters associated with provisioning, configuring, and/or communicating with a respective API endpoint. The characteristics 246 may be determined prior to generation of the resource specifications 244, as part of generating the resource specifications 244, or after the resource specifications 244 are generated. As noted above, each resource specification 244 may include characteristics 246 associated with a respective API endpoint and/or related API method. As such, the service model engine 228 may generate the characteristics 246 simultaneously as the resource specifications 244 are generated.

The service model engine 228 may also generate delivery actions 248 for each of the API endpoints (366). In particular, the service model engine 228 may include a delivery action generator 240 that generates a delivery action 248 for each API endpoint, and in some embodiments, selected API methods from the API endpoints. To generate a delivery action 248, the delivery action generator 240 may select an API endpoint and determine its respective API method. The delivery action generator 240 may then use the API method as the name of the delivery action 248. Then the delivery action generator 240 may determine the parameters associated with the API method from the swagger file 222. From these parameters, the delivery action generator 240 may generate the delivery parameters 250. Delivery parameters 250 generated from parameters associated with a respective API method may be associated with the corresponding delivery action 248.

Following the above VMware Velo Cloud example, the delivery action generator 240 may generate a delivery action associated with the API endpoint "edge" and related API method "edgeProvision." The below Table 6 illustrates the parameters that are passed in the API method and the related delivery parameters that are generated for this API endpoint.

TABLE 6

| API End Point | API methods | API method Description | Parameters passed in the API method | Delivery Action | Delivery Parameter |
|---|---|---|---|---|---|
| edge | edgeProvision | Provisions an Edge before activation. | enterpriseId configurationId name serialNumber modelNumber description haEnabled endpointPkiMode generateCertificate subjectCN subjectO subjectOU challengePassword privateKeyPassword edgeLicenseId customInfo analyticsMode generate Token site id created name logicalId contactName contactPhone contactMobile contactEmail streetAddress | Provision Edge | enterpriseId configurationId name serialNumber modelNumber description haEnabled endpointPkiMode generateCertificate subjectCN subjectO subjectOU challengePassword private KeyPassword edgeLicenseId customInfo analyticsMode generate Token site id created name logicalId contactName contactPhone contactMobile contactEmail streetAddress |

TABLE 6-continued

| API End Point | API methods | API method Description | Parameters passed in the API method | Delivery Action | Delivery Parameter |
|---|---|---|---|---|---|
| | | | streetAddress2 | | streetAddress2 |
| | | | city | | city |
| | | | state | | state |
| | | | postalCode | | postalCode |
| | | | country | | country |
| | | | lat | | lat |
| | | | lon | | lon |
| | | | timezone | | timezone |
| | | | locale | | locale |
| | | | shippingSameAsLocation | | shippingSameAsLocation |
| | | | shippingContactName | | shippingContactName |
| | | | shippingAddress | | shippingAddress |
| | | | shippingAddress2 | | shippingAddress2 |
| | | | shippingCity | | shippingCity |
| | | | shippingState | | shippingState |
| | | | shippingCountry | | shippingCountry |
| | | | shippingPostalCode | | shippingPostalCode |
| | | | modified date and time | | modified date and time |
| | | | haEnabled | | haEnabled |
| | | | endpointPkiMode | | endpointPkiMode |
| | | | generateCertificate | | generateCertificate |
| | | | subjectCN | | subjectCN |
| | | | subjectO | | subjectO |
| | | | subjectOU | | subjectOU |
| | | | challengePassword | | challengePassword |
| | | | private KeyPassword | | privateKeyPassword |
| | | | edgeLicenseId | | edgeLicenseId |
| | | | customInfo | | customInfo |
| | | | analyticsMode | | analyticsMode |
| | | | generate Token | | generateToken |

Once the delivery parameters 250 are determined for each delivery action 248 and/or API endpoint, the service model engine 228 may generate parameter mappings 226 (368). That is, the delivery action generator 240 may map each delivery parameters 250 to a corresponding characteristic in a respective resource specification 244 and/or RFS specification 242. In some embodiments, the delivery parameters 250 are mapped to corresponding characteristics 246 generated from a common API method or by performing a keyword matching process. The parameter mappings 226 may ensure that data sent to the domain controller 220 during service provisioning is derived from the appropriate characteristics 246 in the resource specifications 244.

Following the above VMware Velo Cloud example, below Table 7 illustrates example characteristics 246 that may be generated and associated with a subset of the provisioning and configuration API endpoints identified in Table 2. As shown, for each API endpoint there is a respective API method and an indication of respective resource specifications 244, including RF specifications 242 and child resource specifications 243, that were generated by the service model engine 228. As can be appreciated, the characteristics in Table 7 may be mapped to the delivery parameters provided in Table 6.

TABLE 7

| API End Point | API method | RF Spec | Resources Spec | Child Resource Spec | Characteristics |
|---|---|---|---|---|---|
| Client Device | setClient DeviceHost Name | | Edge | client Device | enterpriseId edgeId hostname macAddress ipAddress logicalId |
| composite Role | createBy Enterprise | Enterprise | VCO Inventory | | userType enterpriseId name description functionalRoleIds |
| composite Role | createBy Enterprise Proxy | | VCO Inventory | | userType enterpriseProxyId name description functionalRoleIds |

TABLE 7-continued

| API End Point | API method | RF Spec | Resources Spec | Child Resource Spec | Characteristics |
|---|---|---|---|---|---|
| composite Role | createBy Operator | Operator | VCO Inventory | | userType networkId name description functionalRoleIds |
| config- uration | cloneAnd Convert Configuration | | VCO Inventory | | configurationId enterpriseId name description guest VLANSegmentObjectId |
| config- uration | cloneConfig- uration | | VCO Inventory | | configurationId id enterpriseId networkId name description |
| config- uration | clone Enterprise Template | | VCO Inventory | | enterpriseId configurationType name description |
| config- uration | insert Configuration Module | | VCO Inventory | | enterpriseId name type description data configurationId version |
| config- uration | updateConfig- uration | | VCO Inventory | | id enterpriseId update name description version effective |
| config- uration | updateConfig- uration Module | | VCO Inventory | | enterpriseId configurationModuleId update data |
| network | insertNetwork GatewayPool | | Network | | networkId enterpriseProxyId name description handOffType ipV4Enabled ipV6Enabled |
| network | updateNetwork Gateway PoolAttributes | | Network | | networkId enterpriseProxyId id gatewayPoolId name description handOffType ipV4Enabled ipV6Enabled |
| edge | deleteEdge | | Edge | | enterpriseId id edgeId edgeIds ids |
| edge | deleteEdge BgpNeighbor Records | | Edge | | edgeId neighborIp |
| edge | edgeCancel Reactivation | | Edge | | enterpriseId edgeId |
| cdgc | edgeProvision | | Edge | | Edge Attributes enterpriseId configurationId name serialNumber modelNumber description haEnabled endpointPkiMode generateCertificate subjectCN subjectO |

TABLE 7-continued

| API End Point | API method | RF Spec | Resources Spec | Child Resource Spec | Characteristics |
|---|---|---|---|---|---|
| | | | | | subjectOU |
| | | | | | challengePassword |
| | | | | | private KeyPassword |
| | | | | | edgeLicenseId |
| | | | | | customInfo |
| | | | | | analyticsMode |
| | | | | | generate Token |
| | | | | Location | Location Attributes |
| | | | | | site |
| | | | | | id |
| | | | | | created |
| | | | | | name |
| | | | | | logicalId |
| | | | | | contactName |
| | | | | | contactPhone |
| | | | | | contactMobile |
| | | | | | contactEmail |
| | | | | | streetAddress |
| | | | | | streetAddress2 |
| | | | | | city |
| | | | | | state |
| | | | | | postalCode |
| | | | | | country |
| | | | | | lat |
| | | | | | lon |
| | | | | | timezone |
| | | | | | locale |
| | | | | | shippingSameAsLocation |
| | | | | | shippingContactName |
| | | | | | shippingAddress |
| | | | | | shippingAddress2 |
| | | | | | shippingCity |
| | | | | | shippingState |
| | | | | | shippingCountry |
| | | | | | shippingPostalCode |
| | | | | | modified date and time |
| | | | | | haEnabled |
| | | | | | endpointPkiMode |
| | | | | | generateCertificate |
| | | | | | subjectCN |
| | | | | | subjectO |
| | | | | | subjectOU |
| | | | | | challengePassword |
| | | | | | private KeyPassword |
| | | | | | edgeLicenseId |
| | | | | | customInfo |
| | | | | | analyticsMode |
| | | | | | generateToken |

The service model engine 228 may generate the service delivery model 230 based on one or more of the resource specifications 244, the delivery actions 248, and/or the parameter mappings 226 (370). In some embodiments, the service delivery model 230 may include the resource specifications 244, including the child specifications 243 and the RFS specifications 242, the characteristics 246, the delivery actions 248, the delivery parameters 250, and the parameter mappings 226. The service delivery model 230 may be transmitted to and stored in a service catalog hosted by the service orchestration system 202, such as the service catalog 114.

Once generated, the service orchestration system 202 may use the service delivery model 230 to service a request from the client device 208. For example, responsive to receiving a service request from the client device 208, the service orchestration system 202 and/or the service model engine 228 may populate respective resource specifications 244 and coordinate with the domain controller 220 to provision and configure resources based on the service request.

Figure 4:
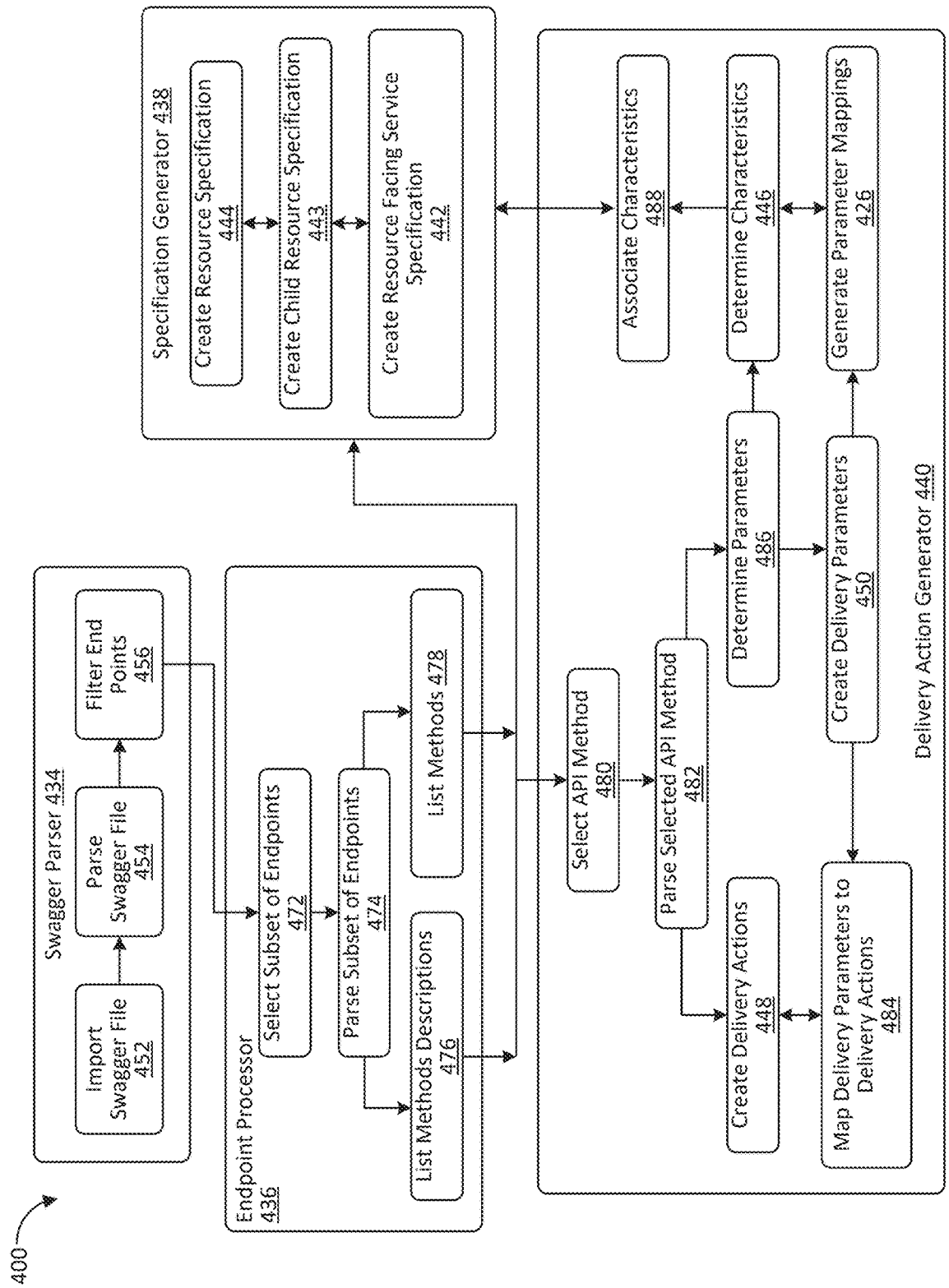
FIG. 4 illustrates an example operational flow of a service model engine, according to an embodiment herein.

Referring now to FIG. 4, an example operational flow 400 of a service model engine is illustrated, according to an embodiment herein. The operational flow 400 may illustrate the process in which a service model engine, such as the service model engine 228 generates a service delivery model, such as the service delivery model 230. As shown, a swagger parser 434, which may be the same or similar to the swagger parser 234, may import a swagger file (452). The swagger file may be the same or similar to the swagger file 222. The swagger file may be imported by the swagger parser 434 from a network vendor, such as the network vendor 204.

Once imported, the swagger parser 434 may parse the swagger file (454), as described above. In particular, the swagger parser 434 may parse the swagger file to determine API endpoints within the swagger file. Depending on the service, the swagger parser 434 may filter the API endpoints (456) to generate an API endpoint listing. As described above, if the service request involves provisioning and configuring resources, then the API endpoints may be filtered (456) to generate an API endpoint listing that contains only the API endpoints related to provisioning and configuration.

From the API endpoint listing, an endpoint processor 436, which may be the same or similar to the endpoint processor 236, may select a subset of API endpoints (472). The subset of API endpoints may be selected to create respective resource specifications and/or RFS specifications. In some embodiments, the subset of API endpoints may be selected based on a respective service. In other embodiments, the endpoint processor may select one API endpoint at a time to parse and walk through the API endpoint listing parsing each respective API endpoint in a looping manner. Once selected, the endpoint processor 436 may parse the subset of API endpoints (474). From the parsing, the endpoint processor 436 may generate a list of API methods (478), also referred to herein as "methods", and determine the related method descriptions (476).

Based on the API methods and related descriptions generated/determined for each API endpoint, the specification generator 438, which may be the same or similar to the specification generator 238, may generate respective resource specifications (444). As described above, the specification generator 438 may generate a resource specification for each of the API endpoints based on the API endpoint and the related API method. The specification generator 438 may also create additional resource specifications based on the API method, such as determining a relationship between two resource specifications and/or API methods and associate the resource specifications with each other. In such cases, the specification generator 438 may create a child resource specification (443) and/or create a resource facing specification (442).

In parallel or subsequent to, a delivery action generator 440 may select an API method (480) and generate a respective delivery action for the selected API method. Once selected, the delivery action generator 440 may parse the selected API method (482) to create delivery actions (448). As noted above, the delivery actions may be determined based on the API method. The delivery action generator 440 may also determine parameters associated with the API method (486). From the parameters, the delivery action generator 440 may create delivery parameters (450) for the selected API method. The delivery action generator 440 may then map the delivery parameters to the delivery actions (484). As can be appreciated, the delivery action generator 440 may perform these steps in a looping manner for each of the API endpoints until delivery actions are generated (448) for each of the API endpoints.

From the parameters, the delivery action generator 440 may generate characteristics (446). In some embodiments, the specification generator 438 may generate the characteristics (446) as part of creating the resource specifications (444). Once the characteristics are generated, the delivery action generator 440 may map the delivery parameters to the related characteristics to generate parameter mappings (426). In some embodiments, the delivery action generator 440 may also associate the characteristics with a respective resource specification (488). The parameter mappings and/or the characteristic association may ensure that the delivery actions are associated with the appropriate resource specifications. From the operational flow 400, the service model engine may generate the service delivery model.

Referring now to FIG. 5, is a diagram of a system 500 configured to implement a service model engine, according to an embodiment herein. The system 500 may be an example of an apparatus including a computing apparatus 591 that is representative of any system or collection of systems in which the various processes, systems, programs, services, and scenarios disclosed herein may be implemented. For example, computing apparatus 591 may be an example service model engine, such as the service model engine 228, a client device, such as the client devices 108, or any of the subcomponents depicted in environments 100 or 200 of FIGS. 1 and 2, respectively. Examples of computing apparatus 591 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 591 may be implemented as a single apparatus, system, or device or may be implemented in a distributed manner as multiple apparatuses, systems, or devices. Computing apparatus 591 may include, but is not limited to, processing system 596, storage system 593, software 595, communication interface system 597, and user interface system 599. Processing system 596 may be operatively coupled with storage system 593, communication interface system 597, and user interface system 599.

Processing system 596 may load and execute software 595 from storage system 593. Software 595 may include a service model engine 592, which may be representative of any of the operations for providing a service model engine or any of its related functions, as discussed with respect to the preceding figures. When executed by processing system 596, software 595 may direct processing system 596 to operate as described herein for at least the various processes, such as the process 300, the operational flow 400, operational scenarios, and sequences discussed in the foregoing implementations. Computing apparatus 591 may optionally include additional devices, features, or functionality not discussed for purposes of brevity.

In some embodiments, processing system 596 may comprise a micro-processor and other circuitry that retrieves and executes software 595 from storage system 593. Processing system 596 may be implemented within a single processing device but may also be distributed across multiple processing devices or sub-systems that cooperate in executing program instructions. Examples of processing system 596 may include general purpose central processing units, graphical processing units, application specific processors, and logic devices, as well as any other type of processing device, combinations, or variations thereof.

Storage system 593 may comprise any memory device or computer-readable storage medium readable by processing system 596 and capable of storing software 595. Storage system 593 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 593 may also include computer readable communication media over which at least some of software 595 may be communicated internally or externally. Storage system 593 may be implemented as a single storage device but may also be implemented across multiple storage devices or sub-systems co-located or distributed relative to each other. Storage system 593 may comprise additional elements, such as a controller, capable of communicating with processing system 596 or possibly other systems.

Software 595 (including the service model engine 592 among other functions) may be implemented in program instructions that may, when executed by processing system 596, direct processing system 596 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 595 may include additional processes, programs, or components, such as operating system software, virtualization software, or other application software. Software 595 may also comprise firmware or some other form of machine-readable processing instructions executable by processing system 596.

In general, software 595 may, when loaded into processing system 596 and executed, transform a suitable apparatus, system, or device (of which computing apparatus 591 is representative) overall from a general-purpose computing system into a special-purpose computing system as described herein. Indeed, encoding software 595 on storage system 593 may transform the physical structure of storage system 593. The specific transformation of the physical structure may depend on various factors in different implementations of this description. Examples of such factors may include, but are not limited to, the technology used to implement the storage media of storage system 593 and whether the computer-storage media are characterized as primary or secondary storage, as well as other factors.

For example, if the computer-readable storage medium is implemented as semiconductor-based memory, software 595 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 597 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 591 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out the methods (or parts of the methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing a service model engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

Examples

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; a service model engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: determine a plurality of API endpoints from a swagger file; generate a plurality of characteristics for each of the API endpoints; generate plurality of resource specifications based on the plurality of API endpoints, wherein: each of the resource specifications comprise one or more characteristics of the plurality of characteristics and the one or more characteristics correspond to parameters for provisioning a respective resource; generate a plurality of delivery actions, wherein each delivery action corresponds to a respective API endpoint in the plurality of API endpoints and comprises a plurality of delivery parameters; generate a plurality of parameter mappings by mapping each of the plurality of delivery parameters to corresponding characteristics in the resource specifications; and generate a service delivery model comprising the resource specifications, the plurality of delivery actions, and the plurality of parameter mappings, wherein the service delivery model is used by a service orchestration system to deliver respective services.

Example 2 is the computing apparatus of any previous or subsequent Example, wherein the processor-executable instructions, when executed by the one or more processors, further direct the computing apparatus to: filter the plurality of API endpoints for API endpoints relating to resource provisioning and configuration; and generate the service delivery model based on a subset of API endpoints relating to provisioning and configuration.

Example 3 is the computing apparatus of any previous or subsequent Example, wherein the processor-executable instructions to generate the plurality of delivery actions, when executed by the one or more processors, further direct the computing apparatus to: generate a delivery action based on an API method associated with a respective API endpoint in the plurality of API endpoints in the swagger file; and determine the plurality of delivery parameters associated with each delivery action based on parameters associated with the respective API method.

Example 4 is the computing apparatus of any previous or subsequent Example, wherein the processor-executable instructions to generate the plurality of resource specifications, when executed by the one or more processors, further direct the computing apparatus to: determine a first API endpoint from the plurality of API endpoints; determine a first API method associated with the first API endpoint; generate a child resource specification based on the first API method; determine a first resource specification associated with the first API method and the first API endpoint; and associate the child resource specification with the first resource specification based on the first API method.

Example 5 is the computing apparatus of any previous or subsequent Example, wherein the processor-executable instructions to generate the plurality of characteristics for each of the API endpoints, when executed by the one or more processors, further direct the computing apparatus to: determine, based on the swagger file, a plurality of parameters associated with provisioning resources for each of the API endpoints.

Example 6 is the computing apparatus of any previous or subsequent Example, wherein the processor-executable instructions, when executed by the one or more processors, further direct the computing apparatus to: generate a listing of a plurality of API methods and a plurality of Method descriptions from the swagger file, wherein: each of the plurality of API methods corresponds to a respective API endpoint of the plurality of API endpoints; and each of the plurality of Method descriptions corresponds to a respective API method of the plurality of API methods.

Example 7 is the computing apparatus of any previous or subsequent Example, wherein the processor-executable instructions, when executed by the one or more processors, further direct the computing apparatus to: receive a service request from a client device; and populate the one or more characteristics within one or more resource specifications of the plurality of resources specifications based on the service request.

Example 8 is a method comprising: identifying, by a service model engine, a swagger file from a network vendor; parsing, by the service model engine, a plurality of API endpoints from the swagger file; determining, by the service model engine, a plurality of API methods and a plurality of Method descriptions from the swagger file, wherein: each of the plurality of API methods corresponds to a respective API endpoint of the plurality of API endpoints; and each of the plurality of Method descriptions corresponds to a respective API method of the plurality of API methods; generating, by the service model engine, a plurality of characteristics for each of the API endpoints based on a respective API method description; generating, by the service model engine, a plurality of resource specifications based on the plurality of API endpoints, wherein each of the resource specifications comprise one or more characteristics of the plurality of characteristics, wherein the one or more characteristics correspond to parameters for provisional a respective resource; generating, by the service model engine, a plurality of delivery actions, wherein each delivery action corresponds to a respective API endpoint in the plurality of API endpoints and comprises a plurality of delivery parameters; mapping, by the service model engine, each of the plurality of delivery parameters to corresponding characteristics in the resource specifications to generate a plurality of parameter mappings; and generating, by the service model engine, a service delivery model comprising the resource specifications, the plurality of delivery actions, and the plurality of parameter mappings, wherein the service delivery model is used by a service orchestration system to deliver respective services.

Example 9 is the API method of any previous or subsequent Example, wherein determining, by the service model engine, the plurality of API methods and the plurality of Method descriptions from the swagger file comprises: selecting, by the service model engine, a first API endpoint from the plurality of API endpoints; parsing, by the service model engine, the swagger file based the first API endpoint to determine one or more first API methods associated with the first API endpoint; and parsing, by the service model engine, the swagger file based on the first API endpoint to determine one or more first Method descriptions associated with the first API endpoint, wherein: the plurality of API methods comprises the one or more first API methods and the plurality of Method descriptions comprise the one or more first Method descriptions.

Example 10 is the API method of any previous or subsequent Example, wherein the plurality of resource specifications comprises one of a child resource specification, a resource facing specification, or an additional resource specification.

Example 11 is the API method of any previous or subsequent Example, wherein the service model engine is part of a service orchestration system and the API method further comprises: receiving, by the service orchestration system, a service request from a client device; and populating, by the service orchestration system, one or more resource specifications of the plurality of resources specifications based on the service request.

Example 12 is the API method of any previous or subsequent Example, wherein generating, by the service model engine, the plurality of resource specifications based on the plurality of API endpoints comprises: determining, by the service model engine, a first API endpoint from the plurality of API endpoints; determining, by the service model engine, a first API method associated with the first API endpoint in the swagger file; and generating, by the service model engine, a first resource specification based on the first API method and the first API endpoint, wherein the plurality of resource specifications comprises the first resource specification.

Example 13 is the API method of any previous or subsequent Example, wherein the API method further comprises: determining, by the service model engine, a subset of API endpoints from the plurality of API endpoints relating to provisioning and configuration; and generating the service delivery model based on the subset of API endpoints.

Example 14 is the API method of any previous or subsequent Example, wherein the API method further comprises: determining, by the service model engine, one or more relationships between the plurality of resource specifications; and associating, by the service model engine, related resource specifications based on the one or more relationships.

Example 15 is a computer-readable storage medium comprising processor-executable instructions, wherein the processor-executable instructions comprise a service model engine configured to cause one or more processors to: determine a plurality of API endpoints from a swagger file; generate a plurality of characteristics for each of the API endpoints based on the swagger file; generate plurality of resource specifications based on the plurality of API endpoints, wherein each of the resource specifications comprise one or more characteristics of the plurality of characteristics, wherein the one or more characteristics correspond to parameters for provisioning a respective resource; generate a plurality of delivery actions, wherein each delivery action corresponds to a respective API endpoint in the plurality of API endpoints and comprises a plurality of delivery parameters; map each of the plurality of delivery parameters to corresponding characteristics in the resource specifications to generate a plurality of parameter mappings; and generate a service delivery model comprising the resource specifications, the plurality of delivery actions, and the plurality of parameter mappings, wherein the service delivery model is used by a service orchestration system to deliver respective services.

Example 16 is the computer-readable storage medium of any previous or subsequent Example, wherein the processor-executable instructions cause the one or more processors to further execute processor-executable instructions stored in the computer-readable storage medium to: determine a plurality of API methods and a plurality of Method descriptions from the swagger file, wherein: each of the plurality of API methods corresponds to a respective API endpoint of the plurality of API endpoints; and each of the plurality of Method descriptions corresponds to a respective API method of the plurality of API methods.

Example 17 is the computer-readable storage medium of any previous or subsequent Example, wherein the processor-executable instructions cause the one or more processors to further execute processor-executable instructions stored in the computer-readable storage medium to: perform a keyword mapping based on a plurality of relationship keywords; determine one or more relationships between the plurality of resource specifications based on the keyword mapping; and associate related resource specifications based on the one or more relationships.

Example 18 is the computer-readable storage medium of any previous or subsequent Example, wherein: the processor-executable instructions cause the one or more processors to further execute processor-executable instructions stored in the computer-readable storage medium to: determine a subset of API endpoints from the plurality of API endpoints relating to provision and configuration, wherein determining the subset of API endpoints comprises performing a keyword search of corresponding Method descriptions; and the processor-executable instructions to generate the service delivery model cause the one or more processors to further execute processor-executable instructions stored in the computer-readable storage medium to: generate the service delivery model based on a subset of API endpoints.

Example 19 is the computer-readable storage medium of any previous or subsequent Example, wherein the processor-executable instructions to generate the plurality of resource specifications based on the plurality of API endpoints cause the one or more processors to further execute processor-executable instructions stored in the computer-readable storage medium to: determine a first API method from a plurality of API methods associated with a first API endpoint of the plurality of API endpoints; generate a resource facing specification based on the first API method; determine a first resource specification associated with the first API endpoint; and associate the resource facing resource specification with the first resource specification.

Example 20 is the computer-readable storage medium of any previous or subsequent Example, the processor-executable instructions cause the one or more processors to further execute processor-executable instructions stored in the computer-readable storage medium to: receive a service request from a client device; and populate the one or more characteristics within one or more resource specifications of the plurality of resources specifications based on the service request.

What is claimed is:
1. A computing apparatus comprising:
a computer-readable storage medium;
a service model engine comprising processor-executable instructions stored on the computer-readable storage medium; and
one or more processors coupled to the computer-readable storage medium and configured to execute the processor-executable instructions, wherein the processor-executable instructions, when executed by the one or more processors, direct the computing apparatus, to at least:
determine a plurality of API endpoints from a swagger file;
generate a plurality of characteristics for each of the API endpoints;
generate plurality of resource specifications based on the plurality of API endpoints, wherein: each of the resource specifications comprise one or more characteristics of the plurality of characteristics and the one or more characteristics correspond to parameters for provisioning a respective resource;
generate a plurality of delivery actions, wherein each delivery action corresponds to a respective API endpoint in the plurality of API endpoints and comprises a plurality of delivery parameters;
generate a plurality of parameter mappings by mapping each of the plurality of delivery parameters to corresponding characteristics in the resource specifications; and
generate a service delivery model comprising the resource specifications, the plurality of delivery actions, and the plurality of parameter mappings, wherein the service delivery model is used by a service orchestration system to deliver respective services.

2. The computing apparatus of claim 1, wherein the processor-executable instructions, when executed by the one or more processors, further direct the computing apparatus to:
filter the plurality of API endpoints for API endpoints relating to resource provisioning and configuration; and
generate the service delivery model based on a subset of API endpoints relating to provisioning and configuration.

3. The computing apparatus of claim 1, wherein the processor-executable instructions to generate the plurality of delivery actions, when executed by the one or more processors, further direct the computing apparatus to:
generate a delivery action based on an API method associated with a respective API endpoint in the plurality of API endpoints in the swagger file; and
determine the plurality of delivery parameters associated with each delivery action based on parameters associated with the respective API method.

4. The computing apparatus of claim 1, wherein the processor-executable instructions to generate the plurality of resource specifications, when executed by the one or more processors, further direct the computing apparatus to:
determine a first API endpoint from the plurality of API endpoints;
determine a first API method associated with the first API endpoint;
generate a child resource specification based on the first API method;
determine a first resource specification associated with the first API method and the first API endpoint; and
associate the child resource specification with the first resource specification based on the first API method.

5. The computing apparatus of claim 1, wherein the processor-executable instructions to generate the plurality of characteristics for each of the API endpoints, when executed by the one or more processors, further direct the computing apparatus to:
determine, based on the swagger file, a plurality of parameters associated with provisioning resources for each of the API endpoints.

6. The computing apparatus of claim 1, wherein the processor-executable instructions, when executed by the one or more processors, further direct the computing apparatus to:
generate a listing of a plurality of API methods and a plurality of Method descriptions from the swagger file, wherein:
each of the plurality of API methods corresponds to a respective API endpoint of the plurality of API endpoints; and
each of the plurality of Method descriptions corresponds to a respective API method of the plurality of API methods.

7. The computing apparatus of claim 1, wherein the processor-executable instructions, when executed by the one or more processors, further direct the computing apparatus to:
receive a service request from a client device; and
populate the one or more characteristics within one or more resource specifications of the plurality of resources specifications based on the service request.

8. A method comprising:
identifying, by a service model engine, a swagger file from a network vendor;
parsing, by the service model engine, a plurality of API endpoints from the swagger file;
determining, by the service model engine, a plurality of API methods and a plurality of Method descriptions from the swagger file, wherein:
each of the plurality of API methods corresponds to a respective API endpoint of the plurality of API endpoints; and each of the plurality of Method descriptions corresponds to a respective API method of the plurality of API methods;
generating, by the service model engine, a plurality of characteristics for each of the API endpoints based on a respective API method description;
generating, by the service model engine, a plurality of resource specifications based on the plurality of API endpoints, wherein each of the resource specifications comprise one or more characteristics of the plurality of characteristics, wherein the one or more characteristics correspond to parameters for provisional a respective resource;
generating, by the service model engine, a plurality of delivery actions, wherein each delivery action corresponds to a respective API endpoint in the plurality of API endpoints and comprises a plurality of delivery parameters;
mapping, by the service model engine, each of the plurality of delivery parameters to corresponding characteristics in the resource specifications to generate a plurality of parameter mappings; and
generating, by the service model engine, a service delivery model comprising the resource specifications, the plurality of delivery actions, and the plurality of parameter mappings, wherein the service delivery model is used by a service orchestration system to deliver respective services.

9. The API method of claim 8, wherein determining, by the service model engine, the plurality of API methods and the plurality of Method descriptions from the swagger file comprises:
selecting, by the service model engine, a first API endpoint from the plurality of API endpoints;
parsing, by the service model engine, the swagger file based the first API endpoint to determine one or more first API methods associated with the first API endpoint; and
parsing, by the service model engine, the swagger file based on the first API endpoint to determine one or more first Method descriptions associated with the first API endpoint, wherein:
the plurality of API methods comprises the one or more first API methods and the plurality of Method descriptions comprise the one or more first Method descriptions.

10. The API method of claim 8, wherein the plurality of resource specifications comprises one of a child resource specification, a resource facing specification, or an additional resource specification.

11. The API method of claim 8, wherein the service model engine is part of a service orchestration system and the API method further comprises:
receiving, by the service orchestration system, a service request from a client device; and populating, by the service orchestration system, one or more resource specifications of the plurality of resources specifications based on the service request.

12. The API method of claim 8, wherein generating, by the service model engine, the plurality of resource specifications based on the plurality of API endpoints comprises:
    determining, by the service model engine, a first API endpoint from the plurality of API endpoints;
    determining, by the service model engine, a first API method associated with the first API endpoint in the swagger file; and
    generating, by the service model engine, a first resource specification based on the first API method and the first API endpoint, wherein the plurality of resource specifications comprises the first resource specification.

13. The API method of claim 8, wherein the API method further comprises:
    determining, by the service model engine, a subset of API endpoints from the plurality of API endpoints relating to provisioning and configuration; and
    generating the service delivery model based on the subset of API endpoints.

14. The API method of claim 8, wherein the API method further comprises:
    determining, by the service model engine, one or more relationships between the plurality of resource specifications; and
    associating, by the service model engine, related resource specifications based on the one or more relationships.

15. A computer-readable storage medium comprising processor-executable instructions, wherein the processor-executable instructions comprise a service model engine configured to cause one or more processors to:
    determine a plurality of API endpoints from a swagger file;
    generate a plurality of characteristics for each of the API endpoints based on the swagger file;
    generate plurality of resource specifications based on the plurality of API endpoints, wherein each of the resource specifications comprise one or more characteristics of the plurality of characteristics, wherein the one or more characteristics correspond to parameters for provisioning a respective resource;
    generate a plurality of delivery actions, wherein each delivery action corresponds to a respective API endpoint in the plurality of API endpoints and comprises a plurality of delivery parameters;
    map each of the plurality of delivery parameters to corresponding characteristics in the resource specifications to generate a plurality of parameter mappings; and
    generate a service delivery model comprising the resource specifications, the plurality of delivery actions, and the plurality of parameter mappings, wherein the service delivery model is used by a service orchestration system to deliver respective services.

16. The computer-readable storage medium of claim 15, wherein the processor-executable instructions cause the one or more processors to further execute processor-executable instructions stored in the computer-readable storage medium to:
    determine a plurality of API methods and a plurality of Method descriptions from the swagger file, wherein:
        each of the plurality of API methods corresponds to a respective API endpoint of the plurality of API endpoints; and
        each of the plurality of Method descriptions corresponds to a respective API method of the plurality of API methods.

17. The computer-readable storage medium of claim 15, wherein the processor-executable instructions cause the one or more processors to further execute processor-executable instructions stored in the computer-readable storage medium to:
    perform a keyword mapping based on a plurality of relationship keywords;
    determine one or more relationships between the plurality of resource specifications based on the keyword mapping; and
    associate related resource specifications based on the one or more relationships.

18. The computer-readable storage medium of claim 15, wherein:
    the processor-executable instructions cause the one or more processors to further execute processor-executable instructions stored in the computer-readable storage medium to:
        determine a subset of API endpoints from the plurality of API endpoints relating to provision and configuration, wherein determining the subset of API endpoints comprises performing a keyword search of corresponding Method descriptions; and
    the processor-executable instructions to generate the service delivery model cause the one or more processors to further execute processor-executable instructions stored in the computer-readable storage medium to:
        generate the service delivery model based on a subset of API endpoints.

19. The computer-readable storage medium of claim 15, wherein the processor-executable instructions to generate the plurality of resource specifications based on the plurality of API endpoints cause the one or more processors to further execute processor-executable instructions stored in the computer-readable storage medium to:
    determine a first API method from a plurality of API methods associated with a first API endpoint of the plurality of API endpoints;
    generate a resource facing specification based on the first API method;
    determine a first resource specification associated with the first API endpoint; and
    associate the resource facing resource specification with the first resource specification.

20. The computer-readable storage medium of claim 15, the processor-executable instructions cause the one or more processors to further execute processor-executable instructions stored in the computer-readable storage medium to:
    receive a service request from a client device; and
    populate the one or more characteristics within one or more resource specifications of the plurality of resources specifications based on the service request.

* * * * *